(12) United States Patent
Dennes et al.

(10) Patent No.: US 9,475,009 B2
(45) Date of Patent: Oct. 25, 2016

(54) FILTRATION METHOD USING POLYIMIDE NANOWEB WITH AMIDIZED SURFACE AND APPARATUS THEREFOR

(75) Inventors: T. Joseph Dennes, Parkesburg, PA (US); Stephen Mazur, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 783 days.

(21) Appl. No.: 12/963,962

(22) Filed: Dec. 9, 2010

(65) Prior Publication Data

US 2011/0139730 A1    Jun. 16, 2011

(51) Int. Cl.

| | |
|---|---|
| *B01D 71/64* | (2006.01) |
| *B01D 67/00* | (2006.01) |
| *B01D 69/00* | (2006.01) |
| *B01D 69/06* | (2006.01) |
| *D04H 1/4326* | (2012.01) |
| *D04H 1/4342* | (2012.01) |
| *H01M 2/16* | (2006.01) |
| *H01M 10/052* | (2010.01) |

(52) U.S. Cl.
CPC ........... *B01D 67/0093* (2013.01); *B01D 69/00* (2013.01); *B01D 69/06* (2013.01); *B01D 71/64* (2013.01); *D04H 1/4326* (2013.01); *D04H 1/4342* (2013.01); *H01M 2/1653* (2013.01); *H01M 10/052* (2013.01)

(58) Field of Classification Search
CPC .... B01D 71/64; B01D 71/56; B01D 61/027; B01D 67/0093; B01D 67/0011; B01D 67/0013; B01D 69/12; B01D 69/02; B01D 69/10; B01D 2323/30; B01D 2323/12; B01D 2325/022; C08L 2312/00; C08L 79/08; C08L 77/00; C08L 77/10; C08G 2650/20; C08G 73/1075; C08G 73/1078; C08G 73/1085; C08G 77/455

USPC ............ 210/767, 735, 500.39; 428/141, 220, 428/221

See application file for complete search history.

(56) References Cited

U.S. PATENT DOCUMENTS

| | | | |
|---|---|---|---|
| 4,851,505 A | 7/1989 | Hayes | |
| 5,976,380 A * | 11/1999 | Moya | ............................ 210/650 |
| 2007/0196663 A1 | 8/2007 | Schwartz et al. | |

(Continued)

FOREIGN PATENT DOCUMENTS

| | | |
|---|---|---|
| EP | 0401005 | 12/1990 |
| EP | 0401005 B1 | 12/1994 |

(Continued)

OTHER PUBLICATIONS

English language machine translation of JP2004-308031.*

(Continued)

*Primary Examiner* — David C Mellon
*Assistant Examiner* — Pranav Patel (57) ABSTRACT

The present invention is directed to the preparation and use of aromatic polyimide nanowebs with amide-modified surfaces. Uses include as a filtration medium, and as a separator in batteries, particularly lithium-ion batteries. The invention is also directed to a method comprising the aromatic polyimide nanoweb with amide-modified surface. The invention is further directed to a multi-layer article comprising the aromatic polyimide nanoweb with amide-modified surface, and to an electrochemical cell comprising the multi-layer article.

20 Claims, 5 Drawing Sheets

(56) References Cited

U.S. PATENT DOCUMENTS

| | | |
|---|---|---|
| 2010/0038306 A1* | 2/2010 | Livingston et al. .......... 210/496 |
| 2010/0151333 A1 | 6/2010 | Nakamori |

FOREIGN PATENT DOCUMENTS

| | | | |
|---|---|---|---|
| GB | WO2007/125367 | * | 11/2007 |
| JP | 2004-308031 | * | 11/2004 |

OTHER PUBLICATIONS

Mazur et al, Electrochemistry of Aromatic Polyimides, J. Electrochem. Soc.:Electrochemical Science and Technology, Feb. 1987, 346-353, vol. 134, No. 2.

Viehbeck et al, Electrochemical Properties of Polyimides and Related Imide Compounds, J. Electrochem. Soc., May 1990, 1460-1466, vol. 137, No. 5.

PCT International Search Report and Written opinion for International Application No. PCT/US2011/063526 Dated Aug. 1, 2012.

* cited by examiner

FILTRATION METHOD USING POLYIMIDE NANOWEB WITH AMIDIZED SURFACE AND APPARATUS THEREFOR

RELATED APPLICATIONS

This application is related in subject matter to U.S. application Ser. No. 12/963,927.

FIELD OF THE INVENTION

The present invention is directed to the preparation and use of aromatic polyimide nanowebs with amide-modified surfaces. Uses include as a filtration medium, and as a separator in batteries, particularly lithium-ion batteries. The invention is also directed to a filtration apparatus comprising the aromatic polyimide nanoweb with amide-modified surface. The invention is further directed to a multi-layer article comprising the aromatic polyimide nanoweb with amide-modified surface, and to an electrochemical cell comprising the multi-layer article.

BACKGROUND OF THE INVENTION

Polyimides have long been valued in the market place for the combination of strength, chemical inertness in a wide variety of environments, and thermal stability. In the last few years, electrospun or electroblown non-woven nanowebs made from polyimides have been prepared, for the first time combining the highly desirable properties of polyimides with a highly porous sheet structure.

Copending applications 61/286,618, 61/286,628, and 61/286,623 disclose the use of fully aromatic polyimide nanowebs as separators in Li-ion batteries and other electrochemical cells.

Honda et al., JP2004-308031A, discloses preparation of polyimide nanowebs by electrospinning polyamic acid solution followed by imidization. Many thousands of polyimide compositions are disclosed including aromatic polyimides. Utility as a battery separator is disclosed.

Jo et al., WO2008/018656 discloses use of a non-fully-aromatic polyimide nanoweb as a battery separator in Li and Li-ion batteries.

Hayes, European Patent 0 401 00581, discloses grafting hydrocarbons to the surface of a semipermeable, permselective polyimide membrane.

It is known that polyimides are hydrolytically unstable at temperatures above 100° C. It is also known that adhesion of polyimide films to certain substrates, such as epoxies, often requires use of a specially formulated adhesive between the layers.

For a variety of end uses, it is desirable to be able to modify the surface chemistry of aromatic polyimide nanowebs to improve compatibility, enhance or reduce wettability, protect the surface from chemical attack, all while retaining the porosity of the nanoweb structure.

SUMMARY OF THE INVENTION

In one aspect, the present invention provides an article comprising a nanoweb comprising nanofibers of aromatic polyimide, said nanoweb having a free surface area at least a portion of which comprises a secondary amide comprising a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

In another aspect, the invention provides a process for chemically altering the surface of an aromatic polyimide nanoweb, the process comprising contacting an aromatic polyimide nanoweb with a solution of a primary amine at a temperature in the range of room temperature to 150° C. for a period of time ranging from 1 to 240 minutes, wherein said primary amine comprises a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

In another aspect, the invention provides a method for filtering the method comprising causing a mixture of a solid and a fluid to wettably impinge upon the surface of a surface modified polyimide nanoweb in such manner that a fluid-rich portion of said mixture is transported through said surface-modified polyimide nanoweb, while a solid-rich portion of said mixture is not so transported; and, wherein said surface-modified polyimide nanoweb comprises a nanoweb comprising nanofibers of aromatic polyimide, said nanoweb having a free surface area at least a portion of which comprises a secondary amide comprising a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

In another aspect, the invention provides a filtration apparatus, the apparatus comprising a housing provided with a first port for introducing a mixture to be filtered, and a second port for discharging a filtrate, said housing comprising a surface-modified aromatic polyimide nanoweb sealingly disposed to be wettably impinged upon the surface thereof by said mixture to be filtered in such manner that a fluid-rich portion of said mixture is transported through said surface-modified polyimide nanoweb, while a solid-rich portion of said mixture is not so transported; and, wherein said surface-modified polyimide nanoweb comprises a nanoweb comprising nanofibers of aromatic polyimide, said nanoweb having a free surface area at least a portion of which comprises a secondary amide comprising a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

In another aspect, the present invention provides a multi-layer article comprising a first electrode material, a second electrode material, and a porous separator disposed between and in contact with said first and said second electrode materials, wherein said porous separator comprises a nanoweb comprising nanofibers of aromatic polyimide, said nanoweb having a free surface area at least a portion of which comprises a secondary amide comprising a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

In another aspect, the present invention provides an electrochemical cell comprising a housing having disposed therewithin, an electrolyte, and a multi-layer article at least partially immersed in said electrolyte; said multi-layer article comprising a first metallic current collector, a first electrode material in electrically conductive contact with said first metallic current collector, a second electrode material in ionically conductive contact with said first electrode material, a porous separator disposed between and contacting said first electrode material and said second electrode material; and, a second metallic current collector in electrically conductive contact with said second electrode material, wherein said porous separator comprises a nanoweb comprising nanofibers of aromatic polyimide, said nanoweb having a free surface at least a portion of which comprises a secondary amide comprising a functional group comprising a hydrocarbyl radical.

In one embodiment said functional group further comprises a functional group comprising oxygen, nitrogen, or sulfur. In a further embodiment said functional group comprising oxygen, nitrogen, or sulfur is an amino group.

DETAILED DESCRIPTION OF THE INVENTION

The present invention provides surface-modified aromatic polyimide nanowebs characterized variously by modified surface tension, novel chemical functionality, and enhanced resistance to chemical degradation. The surface-modified aromatic polyimide nanowebs hereof are useful as filtration media, and as separators in batteries, particularly lithium ion batteries.

For the purposes of the present invention, the ISO 9092 definition of the term "nonwoven" shall be used: "A manufactured sheet, web or batt of directionally or randomly orientated fibres, bonded by friction, and/or cohesion and/or adhesion, excluding paper and products which are woven, knitted, tufted, stitch-bonded incorporating binding yarns or filaments, or felted by wet-milling, whether or not additionally needled. The fibres may be of natural or manufactured origin. They may be staple or continuous filaments or be formed in situ." The term "nanoweb" as employed herein represents a subset of nonwoven articles wherein the fibers are designated "nanofibers" that are characterized by cross-sectional diameters of less than 1 micrometer. The nanowebs employed herein define a planar structure that is relatively flat, flexible and porous, and is formed by the lay-down of one or more continuous filaments.

The term "nanofibers" as used herein refers to fibers having a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension.

The nanofibers employed in this invention consist essentially of one or more fully aromatic polyimides. For example, the nanofibers employed in this invention may be prepared from more than 80 wt % of one or more fully aromatic polyimides, more than 90 wt % of one or more fully aromatic polyimides, more than 95 wt % of one or more fully aromatic polyimides, more than 99 wt % of one or more fully aromatic polyimides, more than 99.9 wt % of one or more fully aromatic polyimides, or 100 wt % of one or more fully aromatic polyimides.

Nanowebs suitable for the present invention may be fabricated by a process selected from the group consisting of electroblowing, electrospinning, or melt blowing of a polyamic acid (PAA) solution, followed by imidization of the thus-fabricated PAA nanoweb. The nanowebs employed in the specific embodiments presented infra have been prepared by electroblowing. Electroblowing of polymer solutions to form a nanoweb is described in some detail in Kim et al., U.S. Published Patent Application 2005/0067732.

Nanowebs comprising nanofibers of aromatic polyimides are suitable for the practice of the invention. An aromatic polyimide is characterized as having at least one aromatic moiety in the polymer backbone repeat unit thereof. For the sake of brevity, as employed herein, the term "nanoweb" shall be understood to mean "a nanoweb comprising nanofibers of aromatic polyimides." Suitable nanowebs are formed by imidization of a polyamic acid characterized as having at least one aromatic moiety in the polymer backbone repeat unit thereof. A suitable PAA is prepared by the condensation polymerization of at least one carboxylic acid dianhydride with at least one diamine, at least one of which is aromatic.

In one embodiment, the aromatic polyimide is a fully aromatic polyimide. The term "fully aromatic polyimide nanoweb" refers to a nanoweb formed by imidization of a PAA nanoweb whereof the PAA is prepared by the condensation polymerization of at least one aromatic carboxylic acid dianhydride and at least one aromatic diamine. In one embodiment, the fully aromatic polyimide nanoweb suitable for use herein comprises a polyimide that is at least 90% imidized and wherein at least 95% of the linkages between adjacent phenyl rings in the polymer backbone are effected either by a covalent bond or an ether linkage. Up to 25%, preferably up to 20%, most preferably up to 10%, of the linkages may be effected by aliphatic carbon, sulfide, sulfone, phosphide, or phosphone functionalities or a combination thereof. Up to 5% of the aromatic rings making up the polymer backbone may have ring substituents of aliphatic carbon, sulfide, sulfone, phosphide, or phosphone. 90% imidized means that 90% of the amic acid functionality of the polyamic acid precursor has been converted to imide. Preferably the fully aromatic polyimide contains no aliphatic carbon, sulfide, sulfone, phosphide, or phosphone.

Suitable aromatic dianhydrides include but are not limited to pyromellitic dianhydride (PMDA), biphenyltetracarboxylic dianhydride (BPDA), and mixtures thereof. Suitable aromatic diamines include but are not limited to oxydianiline (ODA), 1,3-bis(4-aminophenoxy)benzene (RODA), and mixtures thereof. Preferred dianhydrides include pyromellitic dianhydride, biphenyltetracarboxylic dianhydride, and mixtures thereof. Preferred diamines include oxydianiline, 1,3-bis(4-aminophenoxy)benzene, and mixtures thereof. Most preferred are PMDA and ODA.

Suitable fully aromatic polyimides are described by the structural formula where n≥500, preferably ≥1000, Ar and Ar' are each independently an aromatic radical formed from an aromatic compound including but not limited to benzene, naphthalene, biphenyl, diphenylamine, benzophenone, diphenyl alkenyl wherein the alkenyl comprises 1-3 carbons, diphenylsulfonone, diphenylsulfide, diphenylphosphone, diphenylphosphate, pyridine, , or where R1, R2, and R3 are independently an alkenyl radical having 1-3 carbons.

In one embodiment, the polyimide nanoweb consists essentially of polyimide nanofibers formed from pyromellitic dianhydride (PMDA) and oxy-dianiline (ODA), having repeat units represented by the structure,

I

Polyimides are typically referred to by the names of the condensation reactants that form the repeat unit. That practice will be followed herein. Thus, the polyimide consisting essentially of repeat units represented by structure I is designated PMDA/ODA.

While the invention hereof is not limited thereby, it is believed that the method of polymerization can affect the chemical inertness of an aromatic polyimide nanoweb. Excess dianhydride results in polyimides with amine end groups with chemically active hydrogens. By adjusting the stoichiometry to have a slight excess of dianhydride or by end-capping the amines with monoanhydrides, such as phthallic anhydride, those active hydrogens are deactivated.

The polyamic acid is first prepared in solution; typical solvents are dimethylacetamide (DMAC) or dimethylformamide (DMF). In one method suitable for the practice of the invention, the solution of polyamic acid is formed into a nanoweb by electroblowing, as described in Kim et al., op. cit., and in detail, infra. In an alternative method suitable for the practice of the invention, the solution of polyamic acid is formed into a nanoweb by electrospinning as described in Huang et al., Adv. Mat. DOI: 10.1002/adma.200501806. The fully aromatic polyimides employed in the present invention are highly insoluble. The practitioner of the present invention must first form the nanoweb from the polyamic acid, followed by imidization of the nanoweb thus formed.

Imidization of the polyamic acid nanoweb so formed may conveniently be performed by first subjecting the nanoweb to solvent extraction at a temperature of ca. 100° C. in a vacuum oven with a nitrogen purge; Following extraction, the nanoweb is then heated to a temperature of 300 to 350° C. for about 10 minutes or less, preferably 5 minutes or less, to fully imidize the nanoweb. Imidization according to the process hereof results in at least 90%, preferably 100%, imidization. Under most circumstances, analytical methods show that 100% imidization is rarely achieved, even after long imidization times. For practical purposes, complete imidization is achieved when the slope of the percentage imidization vs. time curve is zero.

The aromatic polyimide nanoweb suitable for the practice of the invention can be a so-called enhanced nanoweb characterized by a crystallinity index of at least 0.2. In one embodiment, the enhanced nanoweb consists essentially of nanofibers of PMDA/ODA having a crystallinity index of at least 0.2. An enhanced aromatic polyimide nanoweb is characterized by higher strength, lower electrolyte solvent uptake, and reduced electrolyte solvent-induced loss in physical properties versus a corresponding aromatic polyimide nanoweb that is not enhanced. It is believed that the observed enhancement in properties of the enhanced aromatic polyimide nanoweb is at least partially accounted for by an increase in crystallinity that develops during the process for preparing an enhanced nanoweb.

The enhanced aromatic polyimide nanoweb suitable for use in the present invention is prepared by heating an aromatic polyimide nanoweb within an annealing range. The annealing range depends highly on the composition of the material. The annealing range is 400-500° C. for PMDA/ODA. For BPDA/RODA it is around 200° C.; BPDA/RODA will decompose if heated to 400° C. In general terms, in the process hereof the annealing range begins at least 50° C. above the imidization temperature thereof. For the purposes of the present invention, the imidization temperature for a given aromatic polyamic acid nanoweb is the temperature below 500° C. at which in thermogravimetric analysis, at a heating rate of 50° C./min, the % weight loss/° C. decreases to below 1.0, preferably below 0.5 with a precision of ±0.005% in weight % and ±0.05° C. The fully aromatic polyimide nanoweb is subject to heating in the annealing range for a period of time from 5 seconds to 20 minutes, preferably from 5 seconds to 10 minutes.

In one embodiment, a PMDA/ODA amic acid nanoweb produced by condensation polymerization from solution followed by electroblowing of the nanoweb, is first heated to ca. 100° C. in a vacuum oven to remove residual solvent. Following solvent removal, the nanoweb is heated to a temperature in the range of 300-350° C. and held for a period of less than 15 minutes, preferably less than 10 minutes, most preferably less than 5 minutes, until at least 90% of the amic functionality has been converted (imidized) to imide functionality, preferably until 100% of the amic functionality has been imidized. The thus imidized nanoweb is then heated to a temperature in the range of 400-500° C., preferably in the range of 400-450° C., for a period of 5 seconds to 20 minutes, until a crystallinity index of 0.2 is achieved.

The parameter "crystallinity index" as employed herein refers to a relative crystallinity parameter determined from Wide-Angle X-ray Diffraction (WAXD). The WAXD scan consists of 1) a background signal; 2) scattering from ordered but amorphous regions; 3) scattering from crystalline regions. The ratio of the integral under the peaks identified as crystalline peaks to the integral under the overall scan curve with the background subtracted is the crystallinity index.

In one aspect the invention provides an article comprising a nanoweb comprising nanofibers of aromatic polyimide, said nanoweb having a surface at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

The nanoweb suitable for use herein is made up of randomly overlapping fibers characterized as having a free surface area. The free surface area of the nanoweb is that surface area that is available for contacting by a liquid or gaseous reagent. The free surface area of the nanoweb is essentially the sum of the surface area of each constituent fiber, less the area that is blocked by the overlap of two or more fibers. Methods for directly measuring free surface area are well known, such as nitrogen adsorption, mercury porosimetry, and helium pycnometry. For the purposes of the present invention, a suitable polyimide nanoweb is characterized by porosity of between 20 and 80%. In one embodiment, the porosity is in the range of 30 to 60%.

In another aspect, the invention provides a process for chemically altering the surface of an aromatic polyimide nanoweb, the process comprising contacting an aromatic polyimide nanoweb with a solution of a primary amine at a temperature in the range of room temperature to 150° C. for a period of time ranging from 1 to 240 minutes, wherein said primary amine comprises a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

Although there is no particular limitation on the concentration of the amine solution, it is found in the practice of the invention that at concentrations of about 1% by weight and below, there is little observable effect on the polyimide nanoweb surface.

Following the amidation of the polyimide nanoweb surface, it is desirable to rinse the thus treated nanoweb in several toluene washes to remove unreacted amine. In some cases, it is desirable to dry the amidized polyimide nanoweb. Drying can be accomplished at 95° C.

In one embodiment of the process hereof the solution of primary amine has a concentration in the range of 0.1 to 0.5 M. In one embodiment, the period of time ranges from 1 to 60 minutes.

Solvents suitable for forming a solution of the aliphatic amine include but are not limited to N,N-dimethylformamide, N,N-dimethylacetamide, N-methylpyrrolidone, toluene, and the xylenes. In one embodiment, the solvent is N,N-dimethylformamide. Aliphatic amines suitable for the practice of the invention include but are not limited to octadecylamine, hexadecylamine, or dodecylamine, hexamethylene diamine, histamine, ethylene diamine.

In another aspect, the invention provides a method for filtering the method comprising causing a mixture of a solid and a fluid to wettably impinge upon the surface of a surface modified polyimide nanoweb in such manner that a fluid-rich portion of said mixture is transported through said surface-modified polyimide nanoweb, while a solid-rich portion of said mixture is not so transported; and, wherein said surface-modified polyimide nanoweb comprises a nanoweb comprising nanofibers of aromatic polyimide, said nanoweb having a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment of the method, the nanofibers are characterized as having a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension.

In one embodiment of the method, the aromatic polyimide is a fully aromatic polyimide. In a further embodiment, the fully aromatic polyimide is PMDA/ODA.

The nanoweb hereof is well-suited for so-called depth filtration for removal of fine particulate matter from a fluid stream. In one embodiment, the fluid mixture is a gas holding particulate matter entrained therewithin. In an alternative embodiment, the fluid mixture is a liquid holding particulate matter entrained therewithin. In a further embodiment, the gas is a mixture of gases. In an alternative embodiment, the liquid is a mixture of liquids. The surface-modified aromatic polyimide nanoweb of the invention has the characteristic that the affinity of the surface thereof for a liquid can be adjusted depending upon the specific choice of the hydrocarbyl radical of the secondary amide. For instance, as shown in Comparative Example A, the water contact angle of an aromatic polyimide nanoweb that was not surface modified by amidation was 105°, while in Example 9, after amidation with octadecylamine, the contact angle was 146°, indicating a substantial increase in hydrophobicity. The surface modified aromatic polyimide nanoweb hereof is particularly well suited for filtration applications at strongly basic conditions and in environments characterized by high water vapor content. The surface modified polyimide nanoweb hereof exhibits considerably reduced swelling and concomitant reduced dimensional instability in the presence of water vapor. Transport of the fluid may be effected by such conventional means as gravity, pressure, and capillary action.

In another aspect, the invention provides a filtration apparatus, the apparatus comprising a housing provided with a first port for introducing a mixture to be separated, and a second port for discharging a filtrate, said housing comprising a surface-modified aromatic polyimide nanoweb sealingly disposed to be wettably impinged upon the surface thereof by said mixture in such manner that a fluid-rich portion of said mixture is transported through said surface-modified polyimide nanoweb, while a solid-rich portion of said mixture is not so transported; and, wherein said surface-modified polyimide nanoweb comprises a nanoweb comprising nanofibers of aromatic polyimide, said nanoweb having a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment of the filtration apparatus, the nanofibers are characterized by a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension.

In one embodiment of the filtration apparatus, the aromatic polyimide is a fully aromatic polyimide. In a further embodiment, the fully aromatic polyimide is PMDA/ODA.

Figure 1:
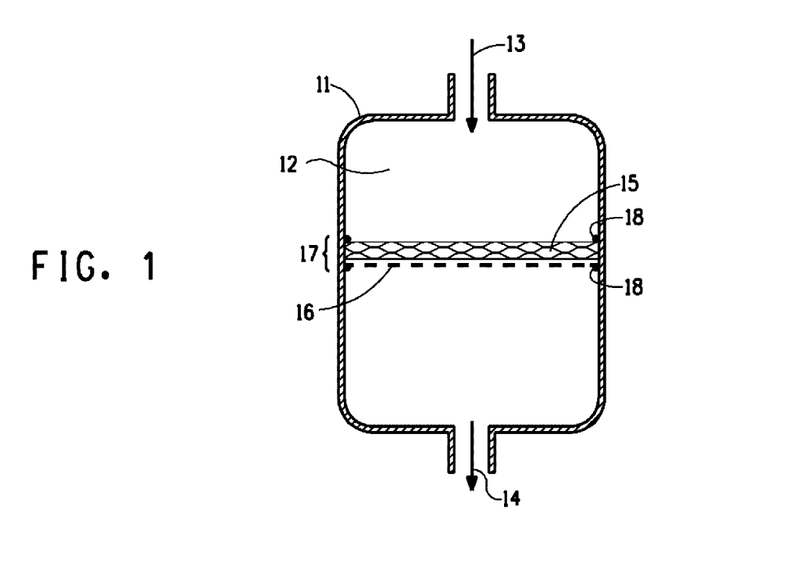
FIG. 1 depicts one embodiment of the filtration apparatus of the invention.

In one embodiment the filtration apparatus further comprises a rigid support member to prevent distortion of the surface modified aromatic polyimide nanoweb as a result of a pressure differential across the thickness of said nanoweb. Said rigid support member is of an open design structure to permit free flow of the filtrate upon exiting the nanoweb. One embodiment of the filtration apparatus is shown in FIG. 1. Referring to FIG. 1, 11 is a housing defining an interior space 12. A suitable housing may be made from any material appropriate to the particular filtration application. For many applications, stainless steel, especially type 316, is an acceptable housing material. As shown the housing is provided with an input port, 13, through which the mixture to be filtered is introduced into the interior space 12, and an output port 14 by which the filtrate is removed. The surface modified aromatic polyimide nanoweb hereof, 15, is combined with a rigid support member, 16, having an open structure to form a filter member, 17. The filter member, 17, is disposed within the interior space, 12, to separate the solids from the filtrate, and is sealingly affixed therewithin by the use of seals, 18, to prevent leakage. Any sealing means known in the art and appropriate for the particular filtration application is suitable for the practice of the invention. Suitable sealing means include o-rings, gasketing, both rubber and metallic, caulking, grease, and the like.

In the discussion supra the term "appropriate" shall be understood to mean that the materials of construction of the filtration apparatus must be selected with the chemical nature of the mixture to be separated, and the temperature of filtration, in mind so that on the one hand the materials of construction will not be subject to corrosion, cracking, or other degradation, and on the other hand, to avoid contamination of the fluid stream.

In another aspect, the invention provides a multi-layer article comprising a first electrode material, a second electrode material, and a porous separator disposed between and in contact with the first and the second electrode materials, wherein the porous separator comprises a nanoweb that includes a plurality of nanofibers wherein the nanofibers consist essentially of aromatic polyimide, said nanoweb having a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment of the filtration apparatus, the nanofibers are characterized by a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension.

In one embodiment of the multi-layer article, the aromatic polyimide is a fully aromatic polyimide. In a further embodiment, the fully aromatic polyimide is PMDA/ODA.

In one embodiment, the first and second electrode materials are different, and the multi-layer article hereof is useful in batteries. In an alternative embodiment, the first and second electrode materials are the same, and the multi-layer article hereof is useful in capacitors, particularly in that class of capacitors known as "electronic double layer capacitors."

In one embodiment, the first electrode material, the separator, and the second electrode material are in mutually adhering contact in the form of a laminate. In one embodiment each electrode material is combined with one or more polymers and other additives to form a paste that is adheringly applied to a surface of the nanoweb separator having two opposing surfaces. Pressure and/or heat can be applied to form an adhering laminate.

In one embodiment wherein the multi-layer article of the invention is useful in lithium ion batteries, a the first electrode material is a negative electrode material that comprises an intercalating material for Li ions. In one embodiment the negative electrode material is selected from the group consisting of carbon, graphite, coke, lithium titanates, Li—Sn Alloys, Si, C—Si Composites, and mixtures thereof. In a further embodiment, the second electrode material is a positive electrode material selected from the group consisting of lithium cobalt oxide, lithium iron phosphate, lithium nickel oxide, lithium manganese phosphate, lithium cobalt phosphate, MNC (LiMn(⅓)Co(⅓)Ni(⅓)O2), NCA (Li(Ni1-y-zCoyAlz)O2), lithium manganese oxide, and mixtures thereof.

In one embodiment the multi-layer article hereof further comprises at least one metallic current collector in adhering contact with at least one of the first or second electrode materials. Preferably the multi-layer article hereof further comprises a metallic current collector in adhering contact with each the electrode material.

In a further embodiment of the multi-layer article of the invention, at least one the electrode materials is coated onto a non-porous metallic sheet that serves as a current collector. In a preferred embodiment, both electrode materials are so coated. In the battery embodiments of the electrochemical cell hereof, the metallic current collectors comprise different metals. In the capacitor embodiments of the electrochemical cell hereof, the metallic current collectors comprise the same metal. The metallic current collectors suitable for use in the present invention are preferably metal foils.

Figure 2:
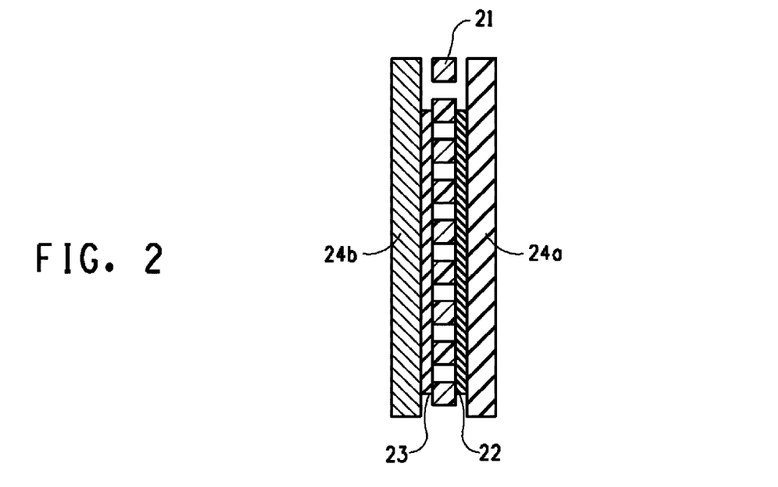
FIG. 2 depicts one embodiment of the multi-layer article of the present invention.

FIG. 2 depicts one embodiment of the multi-layer article of the present invention. Referring to FIG. 2, the multi-layer article of the invention therein depicted comprises a porous nanoweb separator, 21, consisting essentially of polyimide nanofibers consisting essentially of a fully aromatic polyimide, disposed between a negative electrode, 22, and a positive electrode, 23, each electrode being deposited on a non-porous conductive metallic foil, 24a and 24b respectively. In one embodiment, the negative electrode, 22, comprises carbon, preferably graphite, and the metallic foil 24a is copper foil. In another embodiment, the positive electrode, 23, is lithium cobalt oxide, lithium iron phosphate, or lithium manganese oxide and the metallic foil 24b is aluminum foil, and wherein said nanoweb has a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbyl radical is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment, the multi-layer article comprises
a first layer comprising a first metallic current collector;
a second layer comprising the first electrode material, in adhering contact with the first metallic current collector;
a third layer comprising the aromatic polyimide nanoweb, in adhering contact with the first electrode material, wherein said nanoweb has a free surface area at least a portion of which comprises a secondary amide comprising a functional group comprising a hydrocarbyl radical.
a fourth layer comprising the second electrode material, adheringly contacting the aromatic polyimide nanoweb;
and,
a fifth layer comprising a second metallic current collector, adheringly contacting the second electrode material.

The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment, the first layer is copper foil and the second layer is carbon, preferably graphite. In a further embodiment, aromatic polyimide nanoweb of the third layer is an enhanced aromatic polyimide nanoweb. In a further embodiment the aromatic polyimide nanoweb of the third layer is a fully aromatic polyimide nanoweb. In a further embodiment the fully aromatic polyimide nanoweb of the third layer is an enhanced fully aromatic polyimide nanoweb. In a further embodiment the fully aromatic polyimide nanoweb of the third layer is PMDA/ODA. In a further embodiment the PMDA/ODA nanoweb of the third layer is an enhanced PMDA/ODA nanoweb. In another embodiment, the fourth layer is lithium cobalt oxide and the fifth layer is aluminum foil.

In one embodiment, the first layer is copper foil, the second layer is carbon, preferably graphite, the third layer is a nanoweb consisting essentially of nanofibers of PMDA/ODA the fourth layer is lithium cobalt oxide and the fifth layer is aluminum foil, and wherein said nanoweb has a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

Figure 3:
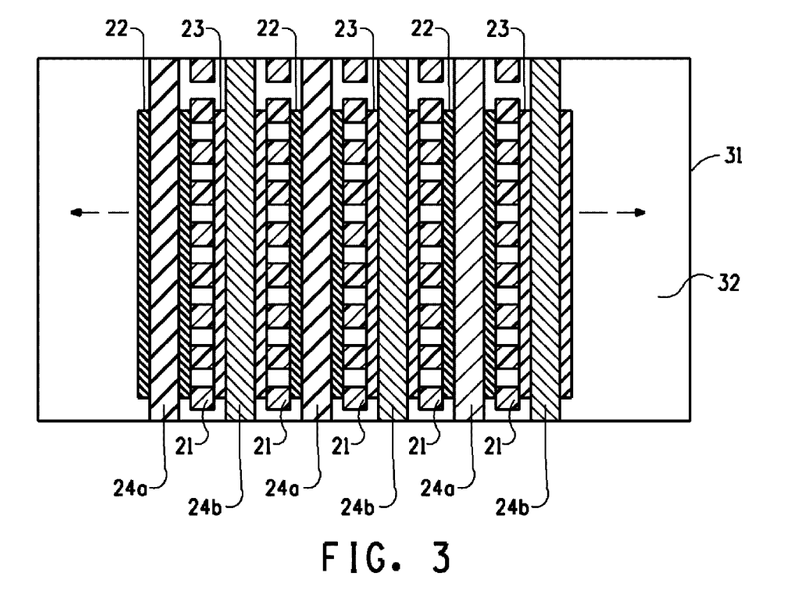
FIG. 3 depicts a prismatic multi-cellular embodiment of the multi-layer article of the present invention.

In a further embodiment, the foil is coated on both sides with the positive or negative electroactive material. This permits the ready formation of a prismatic stack of arbitrary size—and voltage—by alternately layering the two sided foils with the aromatic polyimide nanoweb hereof, as depicted in FIG. 3. The stack so-depicted is typically disposed in a housing, 31, that is filled with an electrolyte solution 32. The stack comprises a plurality of interconnected multi-layer articles of the invention as depicted in FIG. 2. Referring to FIG. 3, a plurality of porous polyimide nanoweb separators, 21, are stacked with alternating layers of negative electrodes, 22, and positive electrodes, 23. In one embodiment the negative electrode material, 22, is carbon, preferably graphite, deposited upon both sides of copper foil, 24a, and the positive electrode material, 23, is lithium cobalt oxide deposited upon both sides of aluminum foil, 24b, and wherein said nanoweb has a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

Figure 4A:
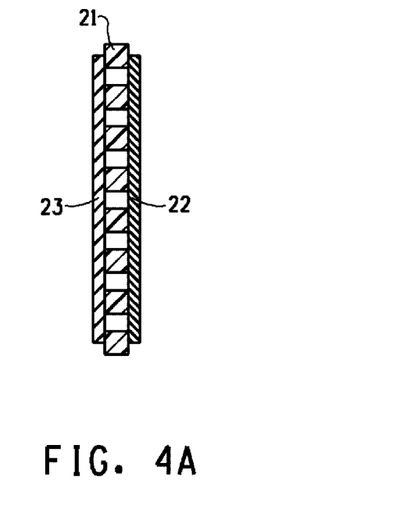
FIGS. 4a and 4b are schematic depictions of further embodiments of the multi-layer article of the invention.

An alternative embodiment of the article of the invention is shown in FIG. 4a. Referring to FIG. 4a, the article of the invention comprises the porous nanoweb separator suitable for use in the present invention, 21, consisting essentially of nanofibers of a fully aromatic polyimide, disposed between a negative electrode, 22, and a positive electrode, 23, each electrode being deposited directly upon opposite sides of the nanoweb, and wherein said nanoweb has a free surface area at least a portion of which comprises a secondary amide comprising a functional group comprising a hydrocarbyl radical. The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

The electrode materials are deposited onto the nanoweb by methods such as are well known in the art including paste extrusion, printing. In one embodiment, the negative electrode comprises carbon, preferably graphite. In another embodiment the positive electrode comprises lithium cobalt oxide, lithium iron phosphate, or lithium manganese oxide, preferably lithium cobalt oxide.

Figure 4B:
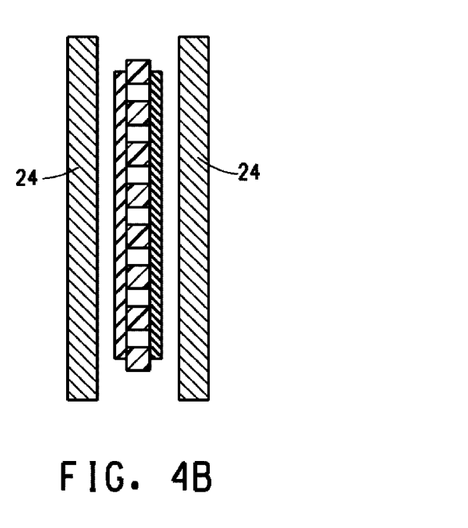

A further embodiment of the configuration of FIG. 4a is depicted in FIG. 4b wherein a layer of metallic foil, 24, is added to the structure of FIG. 4a, as shown. In a preferred embodiment, the multi-layer structure of FIG. 4b is subject to lamination to provide intimate surface to surface contact and adhesion among the layers.

In another aspect, the invention provides an electrochemical cell comprising a housing having disposed therewithin, an electrolyte, and a multi-layer article at least partially immersed in the electrolyte; the multi-layer article comprising a first metallic current collector, a first electrode material in electrically conductive contact with the first metallic current collector, a second electrode material in ionically conductive contact with the first electrode material, an aromatic polyimide nanoweb separator disposed between and contacting the first electrode material and the second electrode material; and, a second metallic current collector in electrically conductive contact with the second electrode material, wherein the aromatic polyimide nanoweb separator comprises a nanoweb that includes a plurality of nanofibers wherein the nanofibers consist essentially of an aromatic polyimide said nanoweb having a free surface area at least a portion of which comprises a secondary amide comprising a functional group comprising a hydrocarbyl radical.

The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment of the filtration apparatus, the nanofibers are characterized by a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension.

In one embodiment of the electrochemical cell, the aromatic polyimide is a fully aromatic polyimide. In a further embodiment, the fully aromatic polyimide is PMDA/ODA.

In one embodiment of the electrochemical cell hereof the first layer of the multi-layer article is copper foil and the second layer thereof is carbon, preferably graphite. In a further embodiment of the electrochemical cell hereof, the aromatic polyimide nanoweb separator of the third layer comprises an enhanced aromatic polyimide nanoweb. In a further embodiment the aromatic polyimide nanoweb separator of the third layer comprises a fully aromatic polyimide nanoweb. In a further embodiment the fully aromatic polyimide nanoweb separator of the third layer comprises an enhanced fully aromatic polyimide nanoweb. In a further embodiment the fully aromatic polyimide nanoweb of the third layer comprises PMDA/ODA. In a further embodiment the PMDA/ODA nanoweb separator of the third layer comprises an enhanced PMDA/ODA nanoweb. In another embodiment, the fourth layer is lithium cobalt oxide and the fifth layer is aluminum foil.

In one embodiment, the first layer is copper foil; the second layer is carbon, preferably graphite; the third layer is a nanoweb consisting essentially of nanofibers of PMDA/ODA; the fourth layer is lithium cobalt oxide; and, the fifth layer is aluminum foil, and wherein said nanoweb has a free surface area at least a portion of which comprises a secondary amide comprising a functional group comprising a hydrocarbyl radical.

The hydrocarbyl radical can be saturated or olefinically unsaturated, and can include an aromatic substituent. In one embodiment the hydrocarbyl radical is a saturated hydrocarbon. In a further embodiment, the hydrocarbon is an alkyl radical. In a further embodiment, the alkyl radical is in the form of an n-alkyl radical. In a further embodiment, the n-alkyl radical is in the range of 10-30 carbons long. In a still further embodiment, the n-alkyl radical is 15-20 carbons long.

In one embodiment said functional group further comprises a functional group comprising oxygen, nitrogen, or sulfur. In a further embodiment said functional group comprising oxygen, nitrogen, or sulfur is an amino group.

In one embodiment of the electrochemical cell hereof, the first and second electrode materials are different, and the electrochemical cell hereof is a battery, preferably a lithium ion battery. In an alternative embodiment of the electrochemical cell hereof the first and second electrode materials are the same and the electrochemical cell hereof is a capacitor, preferably an electronic double layer capacitor. When it is stated herein that the electrode materials are the same it is meant that they comprise the same chemical composition. However, they may differ in some structural component such as particle size.

Referring again to FIG. 3, the electrochemical cell of the invention is formed when the layered stack, shown in FIG. 3, is housed in a liquid-tight housing, 31, which can be a metallic "can," that contains a liquid electrolyte, 32. In a further embodiment the liquid electrolyte comprises an organic solvent and a lithium salt soluble therein. In a further embodiment, the lithium salt is LiPF6, LiBF4 or LiClO4. In a still further embodiment, the organic solvent comprises one or more alkyl carbonates. In a further embodiment, the one or more alkyl carbonates comprises a mixture of ethylene carbonate and dimethylcarbonate. The optimum range of salt and solvent concentrations may vary according to specific materials being employed, and the anticipated conditions of use; for example, according to the intended operating temperature. In one embodiment, the solvent is 70 parts by volume ethylene carbonate and 30 parts by volume dimethyl carbonate and the salt is LiPF6. Alternatively, the electrolyte salt may comprise lithium hexafluoroarsenate, lithium bis-trifluoromethyl sulfonamide, lithium bis(oxalate)boronate, lithium difluorooxalatoboronate, or the Li+ salt of polyfluorinated cluster anions, or combinations of these.

Alternatively, the electrolyte solvent may comprise propylene carbonate, esters, ethers, or trimethylsilane derivatives of ethylene glycol or poly(ethylene glycols) or combinations of these. Additionally, the electrolyte may contain various additives known to enhance the performance or stability of Li-ion batteries, as reviewed for example by K. Xu in Chem. Rev., 104, 4303 (2004), and S. S. Zhang in J. Power Sources, 162, 1379 (2006).

With respect to the layered stack, the stack depicted in FIG. 3 can be replaced by the multi-layer article depicted in FIG. 2. Also present, but not shown, would be a means for connecting the cell to an outside electrical load or charging means. Suitable means include wires, tabs, connectors, plugs, clamps, and any other such means commonly used for making electrical connections.

When the individual cells in the stack are electrically connected to one another in series, positive to negative, the output voltage from the stack is equal to the combined voltage from each cell. When the individual cells making up the stack are electrically connected in parallel, the output voltage from the stack is equal to the voltage of one cell. The average practitioner of the electrical art will know when a series arrangement is appropriate, and when a parallel.

Lithium ion batteries are available in a variety of forms including cylindrical, prismatic, pouch, wound, and laminated. Lithium-ion batteries find use in a variety of different applications (e.g. consumer electronics, power tools, and hybrid electric vehicles). The manufacturing process for lithium ion batteries is similar to that of other batteries such as NiCd and NiMH, but is more sensitive because of the reactivity of the materials used in Li-ion batteries.

The positive and negative electrodes in lithium ion cells suitable for use in one embodiment of the present invention are similar in form to one another and are made by similar processes on similar or identical equipment. In one embodiment, active material is coated onto both sides of a metallic foil, preferably Al foil or Cu foil, which acts as current collector, conducting the current in and out of the cell. In one embodiment, the negative electrode is made by coating graphitic carbon on copper foil. In one embodiment, the positive electrode is made by coating a lithium metal oxide (e.g. LiCoO2) on Al foil. In a further embodiment, the thus coated foils are wound on large reels and are dried at a temperature in the range of 100-150° C. before bringing them inside a dry room for cell fabrication.

Figure 5:
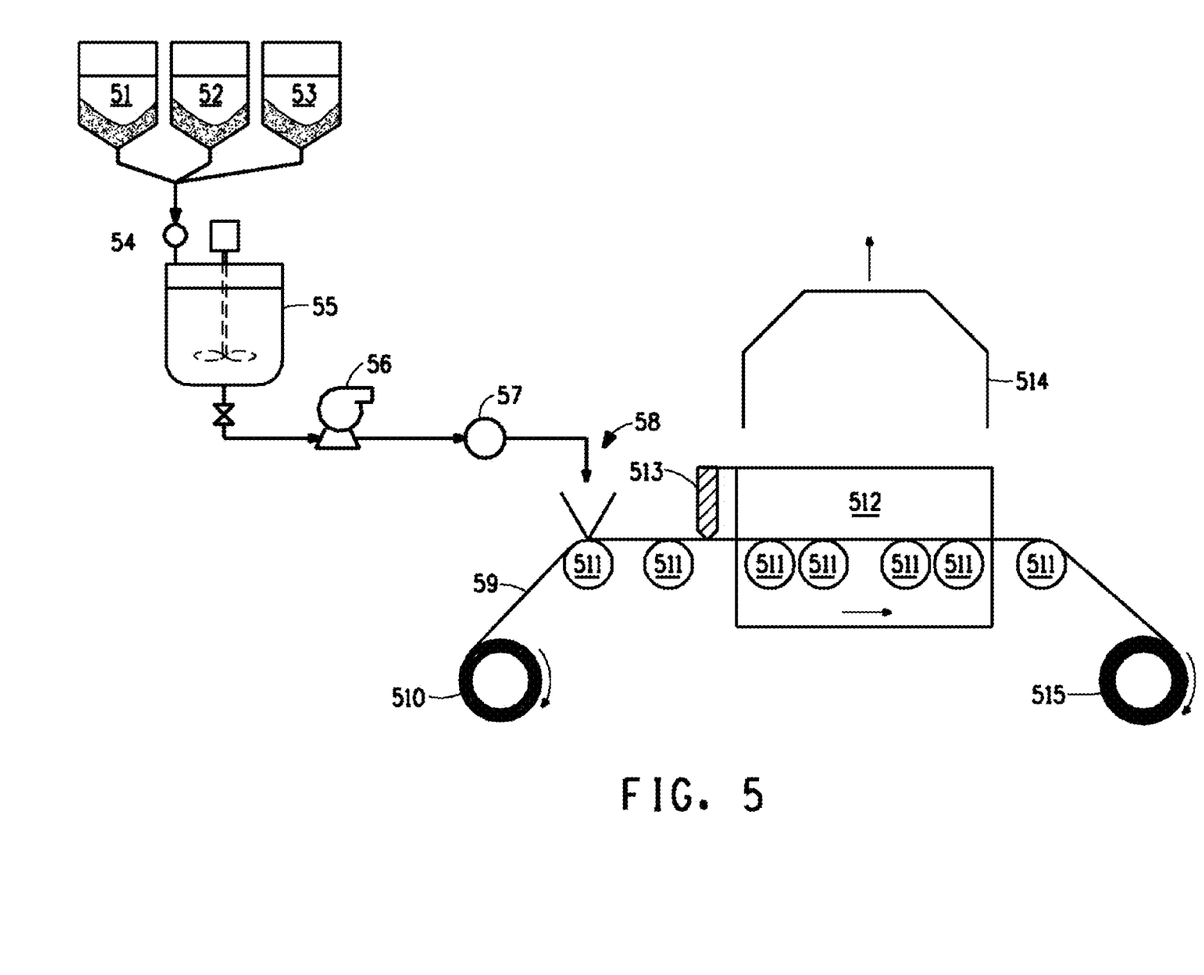
FIG. 5 is a schematic representation of an apparatus suitable for preparing the multi-layer article of the invention.

Referring to FIG. 5, for each electrode, the active material, 51, is combined with a binder solution, 52, and conductive filler, 53, such as acetylene black. The combination so formed is fed through a precision regulator, 54, to a mixing tank, 55, wherein the combination is mixed until it gives a homogeneous appearance. Suitable binders include but are not limited to poly(vinylidene fluoride) homopolymer and copolymer, styrene butadiene rubber, polytetrafluoroethylene, and polyimide. The thus formed slurry is then gravity fed or pressure fed to a pump, 56, which pumps the slurry through a filter, 57, and thence to a coating head, 58. The coating head deposits a controlled amount of the slurry onto the surface of a moving metal foil, 59, being fed from a feed roll, 510. The thus coated foil is conveyed by a series of rolls, 511, through an oven, 512, set at 100 to 150° C. A knife edge, 513, disposed at the entrance of the oven is positioned an adjustable distance above the foil; the thickness of the electrode formed thereby is controlled by adjusting the gap between the knife edge and the foil. In the oven, the solvent is volatilized, typically through a solvent recovery unit, 514. The thus dried electrode is then conveyed to a windup roll, 515.

The electrode thickness achieved after drying is typically in the range of 50 to 150 micrometers. If it is desired to produce a coating on both sides of the foil, the thus oneside coated foil is fed back into the coating machine, but with the uncoated side disposed to receive the slurry deposition. Following coating, the electrodes so formed are then calendered and optionally slit to narrow strips for different size batteries. Any burrs on the edges of the foil strips could give rise to internal short circuits in the cells so the slitting machine must be very precisely manufactured and maintained.

Figure 6:
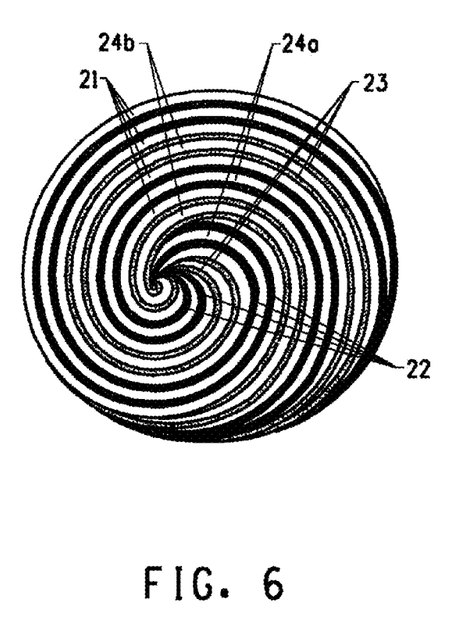
FIG. 6 is a spiral embodiment of the multi-layer article of the invention.

In one embodiment of the electrochemical cell of the invention, the electrode assembly hereof is a spiral wound structure used in cylindrical cells. A structure suitable for use in a spiral wound electrode assembly is shown in FIG. 6. In an alternative embodiment, the electrode assembly hereof is a stacked structure like that in FIG. 3, suitable for use in in prismatic cells. Prismatic cells can be made in wound form also. In the case of a prismatic cell, the wound cell is pressed to form a rectangular structure, which is then pushed inside a rectangular housing.

To form the cylindrical embodiment of a Liion cell of the present invention, the electrode assembly is first wound into a spiral structure as depicted in FIG. 6. Then a tab is applied to the edge of the electrode to connect the electrode to its corresponding terminal. In the case of high power cells it is desirable to employ multiple tabs welded along the edges of the electrode strip to carry the high currents. The tabs are then welded to the can and the spirally wound electrode assembly is inserted into a cylindrical housing. The housing is then sealed but leaving an opening for injecting the electrolyte into the housing. The cells are then filled with electrolyte and then sealed. The electrolyte is usually a mixture of salt (LiPF6) and carbonate based solvents.

Cell assembly is preferably carried out in a "dry room" since the electrolyte reacts with water. Moisture can lead to hydrolysis of LiPF6 forming HF, which can degrade the electrodes and adversely affect the cell performance.

After the cell is assembled it is formed (conditioned) by going through at least one precisely controlled charge/discharge cycle to activate the working materials. For most lithium ion chemistries, this involves creating the SEI (solid electrolyte interface) layer on the negative (carbon) electrode. This is a passivating layer which is essential to protect the lithiated carbon from further reaction with the electrolyte.

In another aspect, the invention provides an electrochemical double layer capacitor (EDLC). EDLCs are energy storage devices having a capacitance that can be as high as several Farads. Charge storage in doublelayer electrochemical capacitors is a surface phenomenon that occurs at the interface between the electrodes, typically carbon, and the electrolyte. In the double layer capacitor hereof, the aromatic polyimide nanoweb hereof serves as a separator that absorbs and retains the electrolyte thereby maintaining close contact between the electrolyte and the electrodes. The role of the aromatic polyimide nanoweb hereof as the separator is to electrically insulate the positive electrode from the negative electrode and to facilitate the transfer of ions in the electrolyte, during charging and discharging. Electrochemical double layer capacitors are typically made in a cylindrically wound design in which the two carbon electrodes and separators are wound together, the aromatic polyimide nanoweb separators having high strength avoid shortcircuits between the two electrodes.

The invention is further described but not limited by the following specific embodiments.

EXAMPLES 1-8 AND COMPARATIVE EXAMPLE A

Polymer Preparation

[HMT E115199-39PI=Polymer 21109, spinning SF44P1 DBX001D15IR20IM501]

A polyamic acid of PMDA and ODA in DMF solvent was prepared per industry standard methods with excess ODA to achieve a 97% stoichiometry and 23% solids by weight. The polyamic acid was end-capped with 0.04% by weight of phthalic anhydride (need to confirm the wt of end-capper).
Nanoweb Preparation The polyamic acid solution was spun into a nanofiber web per the electroblowing process described in U.S. Published Patent Application 2005/0067732 at a solution pressure of 5.5 bar at a temperature of 34° C. and process gas temperature of 55° C. and velocity of 5833 meters/minute. The resulting nanoweb was 21-26 microns thick with a porosity of 63%.

The nanoweb, was passed through a hot air dryer at 180° C. for 1.13 minutes. The thus dried nanoweb was then wound into a roll. The thus prepared polyamic acid nanoweb was then unwound, and then imidized by heating in a Glenro medium wavelength infrared oven to a temperature of about 325° C. for 0.87 minutes and rewound. The web was then unwound and calendered on a BF Perkins calender at a pressure of 2700 pounds per linear inch between a stainless steel calender roll and a cotton covered calender roll and then rewound. The calendered web was then unwound, heat treated a second time at a temperature of about 450° C. for 2.6 minutes and rewound.
Amidation and Test Results Eight samples of the polyimide nanofiber web so prepared, each weighing approximately 35 mg, were added to a preheated solution of 5.0 gm octadecylamine (Aldrich 305391) in 100 mL of anhydrous N,Ndimethylformamide (DMF) (Aldrich 227056) under Nitrogen in a Pyrex vessel fitted with a heating mantle. After each period of time indicated in Table 1, at the solution temperature indicated, one sample was removed and rinsed four times in toluene and dried in a vacuum oven for 1 hour at 95° C. under reduced pressure. A sample of the untreated starting material was retained for comparison.

For each sample attenuated reflectance infrared spectroscopy (ATR/IR) revealed the incorporation of octadecyl groups on the sample surface as indicated by an absorbance peak at 2920 cm-1, due to aliphatic CH stretching modes, in comparison with the peak at 3092 cm-1, due to aromatic CH stretching modes. The incorporation of the aliphatic groups was also accompanied by the growth of a broad absorption at 3360 cm-1 consistent with formation of a secondary amide. As summarized in the table, these measurements showed a substantial decrease in the reaction rate after the first 60 minutes.

As shown in Table 1, with increasing incorporation of octadecylamine the static contact angle for deionized water on the nanofiber web increased from 104.7° to 146.8°, indicative of a highly hydrophobic surface, whereas the mass increased by only 2.5% corresponding to 0.039 equivalents of octadecylamide groups/mole of polyimide. Although not limiting to the scope of the invention, it is believed that the data is consistent with a model in which reaction occurred predominantly on the surface of the nanofibers leaving the core of the polyimide fibers relatively unaltered.

TABLE 1

| Example | Temp. (° C.) | time (min.) | (CH$_2$) Abs.* | Cont. Angle Θ static |
|---|---|---|---|---|
| Comp. Ex. A | 23 | 0 | 5.00E-04 | 104.7 |
| 1 | 120 | 1 | 4.06E-03 | |
| 2 | 130 | 5 | 2.92E-03 | |
| 3 | 133 | 10 | 6.24E-03 | |
| 4 | 130 | 30 | 1.48E-02 | |
| 5 | 130 | 60 | 1.31E-02 | |
| 6 | 125 | 120 | 1.31E-02 | 136.6 |
| 7 | " | 67 | 1.24E-02 | 128.0 |
| 8 | " | 180 | 1.53E-02 | 137.9 |
| 9 | " | 240 | 2.13E-02 | 146.8 |

*Absorbance at 2920 cm$^{-1}$ (normalized to aromatic CH at 3092 cm$^{-1}$)

Portions of the test specimens of Comparative Example A and Example 9 were examined by scanning electron microscopy, as shown in FIGS. 8a and 8b respectively. No difference attributable to the treatment with octadecylamine could be seen in fiber morphology or interstitial spacing.

EXAMPLES 10 AND 11

Polyimide Nanoweb Partially Amidized with N-Alkylamines 5 g of n-dodecylamine was dissolved in 100 mL of DMF solvent. Samples of the polyimide nanoweb of Example 1 were immersed in the solution at 50° C. for periods of 1 hour and 20 hours, respectively. The samples were immersed at the same time, removed after different time intervals, then rinsed three times with isopropanol. Scanning electron microscopy revealed no change in the fiber morphology relative to an unreacted control.

Diffuse reflectance infrared spectroscopy showed absorption peaks at 2852 and 2919 cm-1 confirming aliphatic groups. Peaks at 1545, 1650 and 3267 cm-1 confirmed secondary amide groups. The infrared spectra of the reaction products retained the strong absorption peaks at 1700 and 1500 cm-1 of the original polyimide, suggesting that the amidation reaction was largely restricted to a thin layer of polymer on the surface of the nanofibers.

EXAMPLES 12 AND 13

Polyimide Nanoweb Partially Amidized with N-Alkylamines

A 5% by weight solution of n-hexadecylamine in DMF was prepared. Samples of the polyimide nanoweb of Example 1 were immersed at 50° C. in the solution for periods of 1 hour and 20 hours, respectively, then rinsed three times with isopropanol. Scanning electron microscopy revealed no change in the fiber morphology relative to an unreacted control. Diffuse reflectance infrared spectroscopy showed absorption peaks at 2852 and 2919 cm-1 confirming aliphatic groups. Peaks at 1545, 1650 and 3267 cm-1 confirmed secondary amide groups. The infrared spectra of the reaction products retained the strong absorption peaks at 1700 and 1500 cm-1 of the original polyimide, suggesting that the amidation reaction was largely restricted to a thin layer of polymer on the surface of the nanofibers.

EXAMPLES 14-17 AND COMPARATIVE EXAMPLES B-D

Two 1"×3" wide strips were cut from each of the amidized nanowebs of Examples 10-13 and dried overnight at 90° C. in a vacuum chamber. The thus dried specimens were incorporated into electrochemical coin cells.

Li ion coin cells (CR232) were assembled from components dried at 90° C. overnight in evacuated chamber as follows. Electrodes were obtained from Pred Materials International, NY, N.Y. 10165. The anodes and cathodes comprised respectively natural graphite coated on Cu foil and a layer of LiCoO2 coated on Al foil. The electrolyte comprised 1 Molar LiPF6 in a 70:30 mixture of ethyl methyl carbonate with ethylene carbonate (Ferro Corp., Independence, Ohio 44131).

Anode and cathode were separated by a single layer of one of the amidized polyimide nanowebs of Examples 10-13, 15-25 microns thick. The Li ion coin cells so assembled were attached to a battery tester (Series 4000, Maccor Inc., 2805 W. 40th St., Tulsa, Okla. 74107) and conditioned by cycling three times from 2.75 to 4.2V at 0.25 mA. Capacity retention was measured following an additional 250 cycles at 2.5 mA. Rate capability was determined by measuring discharge capacity from 4.2 to 2.75 at 10 C where C represents the current required to recover the total cell capacity in exactly 1 hour. Capacity at 250th cycle is considered an indicator of cell stability.

Results are summarized in Table 2.

EXAMPLES 18-21

Poly(Amic Acid) Solution 2 (PAA2)

A polyamic acid of PMDA/ODA in DMF was prepared at 97% stoichiometry and 23.5% solids by weight. The amic acid was end-capped with phthalic anhydride at 0.04% by weight. (need to confirm)

Nanoweb #2 (NW-2)

Figure 7A:
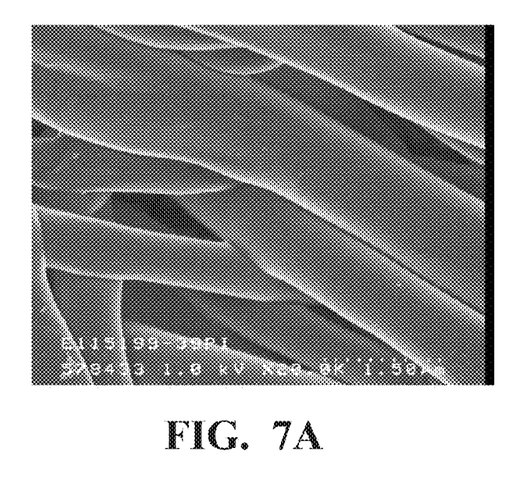
FIG. 7a shows a scanning electron micrograph of a polyimide nanoweb that has not been amidized.
Figure 7B:
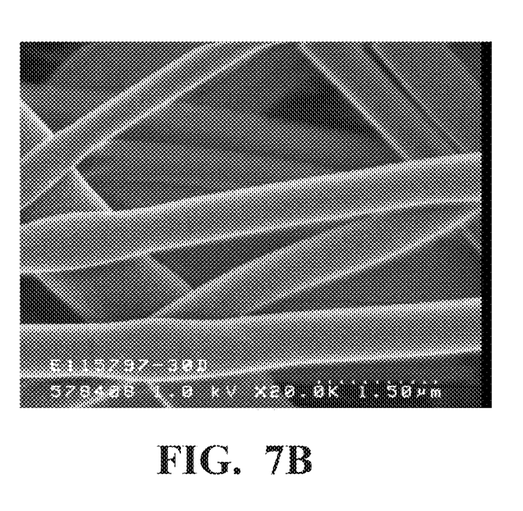
FIG. 7b is a scanning electron micrograph of the polyimide nanoweb of FIG. 7a that has been amidized.

The PAA solution so prepared was charged to the apparatus depicted in FIG. 7. FIG. 7 depicts one embodiment of a suitable electroblowing apparatus. The polyamic acid solution was spun into a nanofiber web per the electroblowing process described in (our provisional) at a solution pressure of 5.5 bar at a temperature of 37° C. and process gas temperature of 72° C. and velocity of 5833 meters/minute.

The nanoweb was then manually unwound and cut with a manual rolling blade cutter into hand sheets approximately 12" long and 10" wide. The resulting nanoweb was characterized by porosity of 85±5%, and basis weight of 18±2 g/m2.

EXAMPLE 18 AND COMPARATIVE EXAMPLE E

Polyimide Nanoweb Partially Amidized with Histamine

A 2×2" sample of the thus formed nanoweb was imidized and annealed in an air convection oven at 350° C. for two minutes, and at 450° C. for two minutes. The thus imidized and annealed sample was placed in a 20 mL glass scintillation vial with 10 mL of methylene chloride and sonicated in a Branson sonication bath for 15 minutes. The thus sonicated sample was removed and dried under nitrogen in a vacuum oven at 100° C. for 10 minutes.

A solution of histamine (Aldrich) was prepared in a 100 mL glass beaker at a concentration of 0.06 M in ethanol. Solid histamine was added to the glass beaker and ethanol was added with stirring to reach a final concentration of 0.06 M. The nanoweb sample dried as above was soaked in the histamine solution for 1 hour at 50° C. The thus soaked nanoweb sample was removed, dried under nitrogen in a vacuum oven at 100° C. for 10 minutes, and subsequently placed in a scintillation vial filled with 10 mL of ethanol and sonicated for 15 minutes in the Branson sonication bath. The thus sonicated sample was removed and dried under nitrogen in a vacuum oven for 10 minutes at 100° C. Presence of amidized surface product was confirmed by FTIR analysis

TABLE 2

| Example | Mazur Notebook | Surface Functionality or Coating | Solution Soak Time (min) | Discharge Capacity at 23° C. (mAh) 250th Cycle at 1 C Rate | Loss at 10 C Rate |
|---|---|---|---|---|---|
| Comp. Ex. B | E115199-96B | none[1] | 0 | | 30-35% |
| Comp. Ex. C | E115199-104A | none[2] | 0 | | 38-40% |
| Comp. Ex. D | E115199-45 | none[3] | 0 | 2.08 | |
| 14 | E115199-99A1 | n-dodecylamide | 1 | 1.94 | 38% |
| 15 | E115199-99A20 | " | 20 | 2.07 | 64% |
| 16 | E115199-99B1 | n-hexadecylamide | 1 | 1.97 | 28% |
| 17 | E115199-99B20 | " | 20 | 2.02 | 43% |

[1]HMT-061009-25-1 (26 μm, porosity 63%)
[2]P1-DBX-001-D15-IR20-02-IM5-01 (21 μm, porosity 60%)
[3]SF-44-DCQ-001-IR550-N60-5 (26 μm, porosity 66%)

with an attenuated total reflectance (ATR) attachment via the presence of characteristic absorptions at 2920 cm$^{-1}$ and 2850 cm$^{-1}$. Contact angle analysis was also performed. The un-amidized nanoweb control (Comparative Example E) exhibited a static water constact angle of 150°±4° while the histamine-treated samples exhibited a static water constact angle of 0°. Water droplets were observed to wick into the structure completely. Each data point was an average of at least three trials each.

EXAMPLE 19

Polyimide Nanoweb Partially Amidized with N,N-Diethylethylenediamine

The procedures of Example 18 were repeated with further 2×2" samples of the nanoweb of Example 18 except that the 0.06 M histamine solution of Example 18 was replaced by a 0.086 M solution of N,N-diethylethylenediamine (Aldrich) in ethanol. Presence of amidized surface product was confirmed by FTIR analysis with an attenuated total reflectance (ATR) attachment via the presence of characteristic absorption at 2920 cm$^{-1}$ and 2850 cm$^{-1}$. The N,N-diethylethylenediamine treated sample exhibited a static water contact angle of 0°.

EXAMPLE 20

Polyimide Nanoweb Partially Amidized with Hexamethylene Diamine

The procedures of Example 18 were repeated with further 2×2" samples of the nanoweb of Example 18 except that the 0.06 M histamine solution of Example 18 was replaced by a 0.05 M solution of hexamethylene diamine(Aldrich) in ethanol, and the soak time was 20 hours instead of the 1 hour of Example 18. Presence of amidized surface product was confirmed by FTIR analysis, as in Example 18. Contact angle analysis was also performed. The hexamethylene diamine treated sample exhibited a static water contact angle of 0°.

EXAMPLE 21

One 6 mg (approximately 2 cm×2 cm) aliquot of each of the amidized nanoweb samples prepared respectively according to Examples 18, 19 and 20, as well as a 6 mg aliquot of the nonamidized control, was packed individually into a 2 mL pasteur pipette. A 0.20 mL aliquot of deionized water was added to each pipette, and the time required for the water to flow through the nanoweb packed column was recorded. After 24 hrs, no water had flowed through the pipette holding the control sample. The water flowed completely through the pipettes packed with material prepared in Examples 18, 19, and 20 within 10 minutes.

We claim:

1. A method for filtering comprising causing a mixture of a solid and a fluid to wettably impinge upon the surface of a surface modified polyimide nanoweb in such manner that a fluid-rich portion of said mixture is transported through said surface-modified polyimide nanoweb, while a solid-rich portion of said mixture is not so transported; and, wherein said surface-modified polyimide nanoweb comprises a nanoweb consisting essentially of nanofibers of fully aromatic polyimide, said nanoweb having a free surface area at least a portion of which is chemically modified by reaction with a primary amine to form a secondary amide comprising a functional group comprising a hydrocarbon radical.

2. The method of claim 1 wherein said functional group further comprises a functional group comprising oxygen, sulfur or nitrogen.

3. The method of claim 2 wherein said functional group is an amine.

4. The method of claim 1 wherein said nanofibers are characterized by a number average diameter in the range of 50 to 500 nanometers.

5. The method of claim 4 wherein said nanofibers are characterized by a number average diameter in the range of 100 to 400 nanometers.

6. The method of claim 1 wherein said hydrocarbon radical is a saturated hydrocarbon radical.

7. The method of claim 6 wherein said saturated hydrocarbon radical is an alkyl radical.

8. The method of claim 7 wherein said alkyl radical is a n-alkyl radical.

9. The method of claim 8 wherein said n-alkyl radical has 15 to 20 carbon atoms.

10. The method of claim 1 wherein said fully aromatic polyimide is PMDA/ODA.

11. An apparatus comprising a housing provided with a first port for introducing a mixture to be filtered, and a second port for discharging a filtrate, said housing comprising a surface-modified aromatic polyimide nanoweb therewithin sealingly disposed to be wettably impinged upon the surface thereof by said mixture to be filtered in such manner that a fluid-rich portion of said mixture is transported through said surface-modified polyimide nanoweb, while a solid-rich portion of said mixture is not so transported; and, wherein said surface-modified polyimide nanoweb comprises a nanoweb consisting essentially of nanofibers of fully aromatic polyimide, said nanoweb having a free surface area at least a portion of which is chemically modified by reaction with a primary amine to form a secondary amide comprising a functional group comprising a hydrocarbon radical.

12. The apparatus of claim 11 wherein said functional group further comprises a functional group comprising oxygen, sulfur or nitrogen.

13. The article of claim 12 wherein said functional group is an amine.

14. The apparatus of claim 11 wherein said nanofibers are characterized by a number average diameter in the range of 50 to 500 nanometers.

15. The apparatus of claim 14 wherein said nanofibers are characterized by a number average diameter in the range of 100 to 400 nanometers.

16. The apparatus of claim 11 wherein said hydrocarbon radical is a saturated hydrocarbon radical.

17. The apparatus of claim 16 wherein said saturated hydrocarbon radical is an alkyl radical.

18. The apparatus of claim 17 wherein said alkyl radical is a n-alkyl radical.

19. The apparatus of claim 18 wherein said n-alkyl radical has 15 to 20 carbon atoms.

20. The apparatus of claim 11 wherein said fully aromatic polyimide is PMDA/ODA.

* * * * *